(12) United States Patent
Medvinsky et al.

(10) Patent No.: US 10,348,489 B2
(45) Date of Patent: Jul. 9, 2019

(54) INTERNET OF THINGS (IOT) METHOD FOR UPDATING A MASTER KEY (71) Applicant: ARRIS Enterprises LLC, Suwanee, GA (US)

(72) Inventors: Alexander Medvinsky, San Diego, CA (US); Tat Keung Chan, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 345 days.

(21) Appl. No.: 15/339,864

(22) Filed: Oct. 31, 2016

(65) Prior Publication Data
US 2017/0126402 A1 May 4, 2017

Related U.S. Application Data (60) Provisional application No. 62/248,339, filed on Oct. 30, 2015.

(51) Int. Cl.
H04L 9/08 (2006.01)
H04L 9/06 (2006.01)
H04L 29/06 (2006.01)

(52) U.S. Cl.
CPC ............ *H04L 9/083* (2013.01); *H04L 9/0631* (2013.01); *H04L 9/0643* (2013.01); *H04L 9/0822* (2013.01); *H04L 9/0833* (2013.01); *H04L 9/0866* (2013.01); *H04L 63/166* (2013.01); *H04L 2209/24* (2013.01)

(58) Field of Classification Search
None
See application file for complete search history.

(56) References Cited

U.S. PATENT DOCUMENTS

2004/0139187 A1* 7/2004 Park ................... H04L 12/2803
709/223
2004/0146163 A1 7/2004 Asokan et al.
(Continued)

FOREIGN PATENT DOCUMENTS

EP 1011222 A2 6/2000
EP 3104548 A1 * 12/2016 ............... H04L 9/08

OTHER PUBLICATIONS

PCT Search Report & Written Opinion, Re: Application No. PCT/US2016/059795, dated Feb. 3, 2017.
(Continued)

*Primary Examiner* — Yogesh Paliwal
*Assistant Examiner* — Hassan Saadoun
(74) *Attorney, Agent, or Firm* — Thomas A. Ward (57) ABSTRACT A method is provided for providing a new master key to devices in a Thread network for an Internet of Things (IOT). To provide the new master key, Device Provisioning Key (DPK) is generated from a Network Seed Key (NSK) known to a Commissioner and Leader in a local network. The Commissioner provides the DPK as a unique per-device key to each device in the network to establish a secure session. The DPK is derived from the NSK as follows: DPK=OWF (NSK, ID), wherein OWF is a One Way Function, and ID is a unique device identifier for each device. The new master key can then be sent from the commissioner to the new devices to establish a secure session created using the DPK.

14 Claims, 9 Drawing Sheets (56) References Cited

U.S. PATENT DOCUMENTS

2010/0220856 A1     9/2010   Kruys et al.
2011/0299685 A1    12/2011   Hall

OTHER PUBLICATIONS

M. Steiner, "Secure Group Key Agreement", Mar. 15, 2002, pp. 1-218, retrieved from the Internet at URL:http://scidok.sulb.uni-saarland.de/voltexte/2004/239/pdf/Steiner_ProfDrBirgitPfitzmann.pdf, retrieved on Jan. 24, 2017, pp. 26-27; pp. 86-87.

Thread Group, "Thread Commissioning", Jul. 13, 2015, retrieved from the Internet at URL:http://threadgroup.org/Portals/0/documents/whitepapers/Thread Commissioning white paper_v2_public.pdf; retrived on Jan. 18, 2017, p. 8.

* cited by examiner

INTERNET OF THINGS (IOT) METHOD FOR UPDATING A MASTER KEY

CROSS REFERENCE TO RELATED APPLICATION

This Application claims priority under 35 U.S.C. § 119(e) from earlier filed U.S. Provisional Application Ser. No. 62/248,339 filed on Oct. 30, 2015 and incorporated herein by reference in its entirety.

BACKGROUND

Technical Field

The present invention relates to providing a master key change for devices in a network or being added to the network. More particularly, the present invention relates to sending a new master key shared by a group of devices in an IOT home network in a secure manner.

Related Art

The Thread standard for IOT networks defines security as based on a Master Key that is provided to all devices that are within the IOT network, typically limited to one home. This Master Key is used to encrypt all communications between IOT devices owned by that user. IOT devices can for example be network-enabled light bulbs, blinds, smoke detectors, dishwasher, refrigerator as well as devices with more computing resources such as PCs, laptops and smartphones. All such IOT devices are required to have computing power, computer storage and ability to run software that implements network communications with the other devices on that network.

It can be desirable to make changes to the master key which may be important under several circumstances. First, a user may sell or dispose of an IOT device and want to change the master key to make sure that any potential copies of the Master Key in a lost, stolen, sold or otherwise disposed of device cannot be used to gain access to that user's network. In another circumstance, the user might set a device to be repaired and want to change the Master Key to make sure that the service or repair center cannot use the old Master Key to gain access to that user's network. In another circumstance, the user may periodically want to schedule changes to the Master Key just in case someone were to hack into one of his devices and steal the current Master Key. All these examples create circumstances where it is desirable to have a procedure for changing the Master key.

A master key change was added to the Thread specification where a new master key is broadcast to all devices in the network encrypted with the current master key. A master key change would allow an application on the network, or off the network, to send a new master key to all or specific devices in the network and then all devices will move to using the new master key. The feature would allow replacement of the master key in all devices in the network, or to replace it in most devices and kick off the network those devices that do not receive the updated key. It is desirable for this master key change to occur within minutes and not be visible to the user in terms of device operation.

Two drawbacks might be encountered when updating a master key in this manner, making the master key update process somewhat complex. In a first drawback scenario some devices may be turned off or be out of range when the master key update is first broadcast through the time when the new master key update takes effect. The inaccessible devices will never get that broadcast message. The only way to recover those devices is to have them provision into the network from the very beginning using a process called commissioning. The user would have to enable this commissioning process and supply a commissioning pincode as defined within the Thread standard. This process will inconvenience the user and should not be necessary to repeat multiple times every time that a master key changes.

In the second drawback example, if a device is stolen and is still within a wireless network range (e.g., within WiFi network range) such as located in a parking lot or in the neighbor's house—that device will be able to listen in on communications and use its old master key to decrypt any new master key. The stolen device would then be able to snoop on the user's network communications or reconfigure the user's other devices without authorization.

It is desirable to provide a process for updating the master key in a Thread network, or a similar network, that process working in an efficient manner to enable a secure provisioning of the master key to all devices in the network without encountering the drawbacks described.

SUMMARY

According to embodiments of the present invention, a method allows for providing a new master key to devices in a network that addresses the issues for providing an updated master key and the drawbacks described above.

To provide the new master key, embodiments of the present invention first derive a Device Provisioning Key (DPK) from a Network Seed Key (NSK) known to a Commissioner and all router-class devices (including the Leader) in a local network. Note that typically in an iOT network that utilizes a self-healing mesh network architecture, any router-class devices may be eligible to be elected to be the Leader, in case the current Leader becomes offline. In the following, the term Leader includes all router-class devices in the network. The Commissioner provides the DPK which is a unique per-device key to each device in the network to establish a secure session. The DPK is derived from the NSK as follows: DPK=OWF(NSK, ID), wherein OWF is a One Way Function, and ID is a unique device identifier for each device. The new master key can then be sent from the commissioner to the new devices under the secure session created using the DPK.

At least four embodiment versions of the present invention are contemplated for using the DPK to securely provide the new master key. These embodiments are described to follow.

In a first version, a method provides a new master key to devices in a network with the steps including: triggering the Commissioner by an event to generate the new master key; Broadcasting from the Commissioner a message to all devices in the network that the Commissioner intends to change to the new master key; Receiving requests at the Commissioner from the devices in the network to change the Master Key to the New Master Key; Deriving within the commissioner a DPK for each of the requesting devices; establishing a new secure session between the Commissioner and each of the devices using a device-unique DPK for each requesting device as a pre-shared key; Sending by the commissioner the new master key to the requesting device, protected with the new secure session; and Broadcasting by the commissioner a message to every device in the network that they can start using the New Master Key.

In the first version, when one or more devices in the network is offline and misses the broadcast for the New Mater key, at a later time a request from a device in the network that missed the New Master key is provided. At that time, the commissioner in response to the request derives a further DPK specific to the later requesting device. The Commissioner then establishes a secure session using the further DPK and transmits the New Master Key to the later requesting device during the secure session.

In the first version, before the New Master Key is provided to the network devices, an initial Master Key is established and provided to devices in the network using the following steps. First, an initial secure session is established with a commissioning PIN provided from a commissioner device, with the secure session being in Datagram Transport Layer Security (DTLS). Next, within the Commissioner an initial DPK unique to each device in the network is derived based on an identifier for the each device, such as a MAC Address of the device. Finally, the initial Master Key and the DPK are sent to the new device under the initial secure session, wherein the initial Master Key is used to encrypt and decrypt communications in the network.

A second version includes the same steps to securely provide a Master Key update as version 1, except the secure session is not necessary to deliver the New Master Key to each device. Instead, the New Master Key is encrypted and authenticated directly with the DPK without the need for such a secure session.

The third version also includes the same steps to securely provide a Master Key update as version 1, except that the update to the new Master Key is broadcast encrypted with the initial or current Master Key. Devices that happened to be off-line during the broadcast for a change to the new Master Key use their DPK to establish a secure session with the Commissioner to request the New Master key, as the initial Master Key will have been replaced.

The fourth version includes the same steps to securely provide a Master Key update as version 3, except that the New Master Key is directly encrypted and authenticated with the DPK instead of first establishing a secure session.

Embodiments of the present invention also include further method of establishing a new NSK when a new Commissioner is installed to replace an original Commissioner. The method of creating a new NSK with the new Commissioner uses the following steps: generating a parameter α using the new commissioner; generating the new NSK (NNSK) using the new commissioner, wherein the devices can determine the NNSK from α; broadcasting α from the commissioner encrypted using the new master key to devices in the network; and replacing NSK with NNSK in the new commissioner.

BRIEF DESCRIPTION OF THE DRAWINGS

Further details of the present invention are explained with the help of the attached drawings in which.

DETAILED DESCRIPTION

I. Overview
  A. System Components

Figure 1:
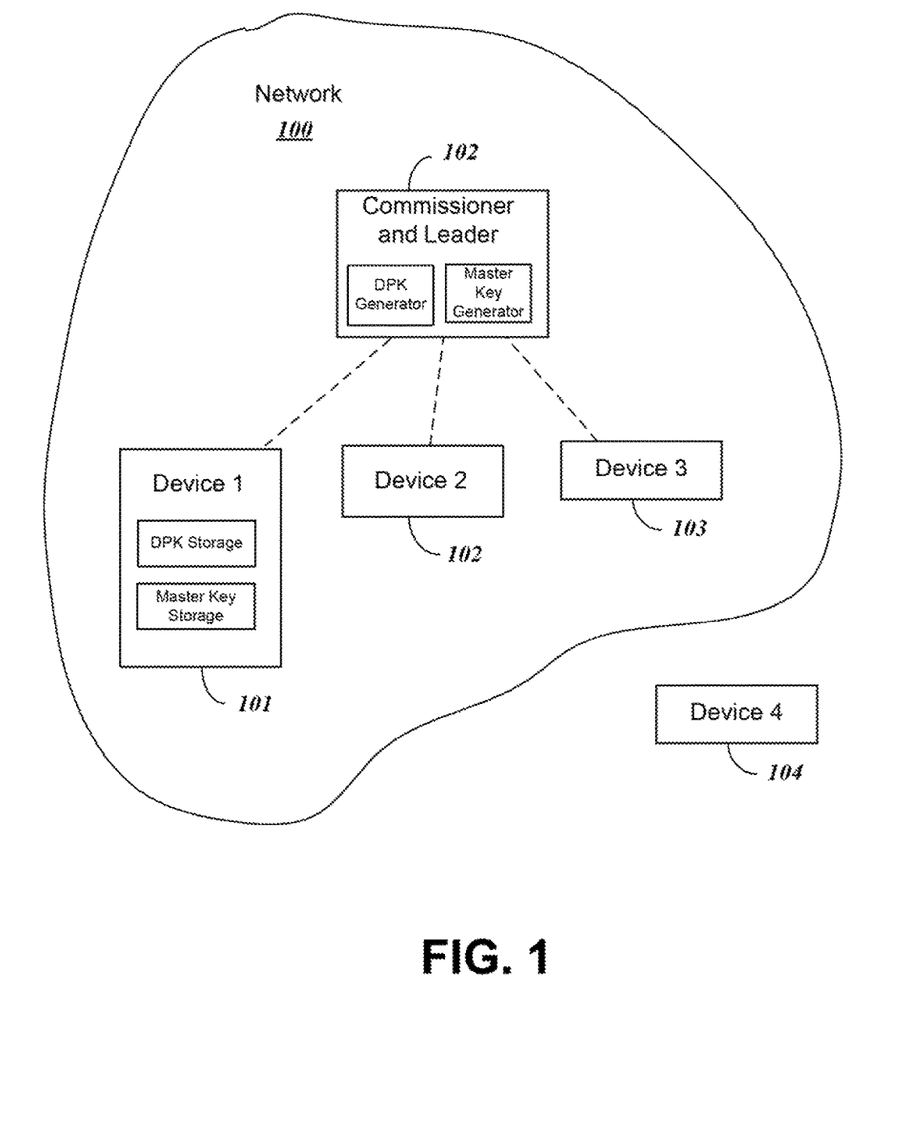
FIG. 1 illustrates a network with components which can be used to authenticate or secure devices using a master key as well as components according to embodiments of the present invention needed for a Master Key update.

FIG. 1 illustrates an IOT network which can be a Thread network for an IOT. Although discussed in the context of a Thread network, this invention is not limited to Thread networks and could apply to any home network of devices, including IOT and non-IOT devices. The network of FIG. 1 shows components used to authenticate or secure devices using a master key, as well as components according to embodiments of the present invention needed for a Master Key update. The components include a Commissioner and Leader 100 that includes components to generate a Master Key and transmit the master key securely to devices 101-103 in the network. The Commissioner 100 also includes components to generate the DPK and transmit that to devices 101-103 in the network. The network device 101 shows that the network devices include storage for the DPK and the Master Key. FIG. 1 also illustrates that devices such as 104 can be outside the network. The device 104 might be outside the transmission range of the Commissioner, specifically excluded from the network by the Commissioner, or turned off while the Commissioner is authorizing devices to be in the network. A description of details of the function of components in FIG. 1 is provided to follow.

The components shown in FIG. 1, such as the commissioner 100 or the devices 101-104, are each presumed to include a mechanism for transmitting and receiving data to other components. Each component also includes a processor and memory, with the memory storing data as well as storing code that is executable by the processor to execute steps of processes that are described subsequently.

B. Deriving a DPK

Embodiments of the present invention provide a solution for generating a master key. The solution requires that each device possess a unique per-device key which is called a Device Provisioning Key (DPK). The DPKs are derived from a global key known to a Commissioner and Leader in the IOT network. That global key is termed a Network Seed Key NSK. The DPK is derived from the NSK as follows:

DPK=OWF(NSK,ID), where OWF is a One Way Function.

In general, OWF could be any one-way-function such as a SHA-1 or SHA-256 hash, AES encrypt or decrypt, etc. The ID is a unique device identifier such as an IEEE 48-bit or 64-bit MAC Address.

C. Master Key Change Goals

The goal of a Master Key Change is for an application on the network, or off network, to send a new master key to all devices in the network and then all devices will move to using the new master key. For the basic operational master key change, the following features are optionally provided in embodiments of the present invention: 1. A local or remote tool, such as the Commissioner or Leader, is used to push a new master key to the network. 2. Once the Master Key update is completed to those devices receiving it, a command is then provided that can be sent out to the network to switch to the new master key. 3. After the master key update, a local or remote tool can then send a command to stop use of an old key on the network. 4. Devices that miss the master key change would end up off the network, so a process is provided to recommission them. 5. A mechanism is also provided for a local or remote tool to send a device a command to delete network and security data from a selected device that is to be decommissioned.

II. Versions of Master Key Updates

Embodiments of the present invention provide for at least four versions described to follow for updating the master key to a network of devices.

A. Version 1

Figure 2A:
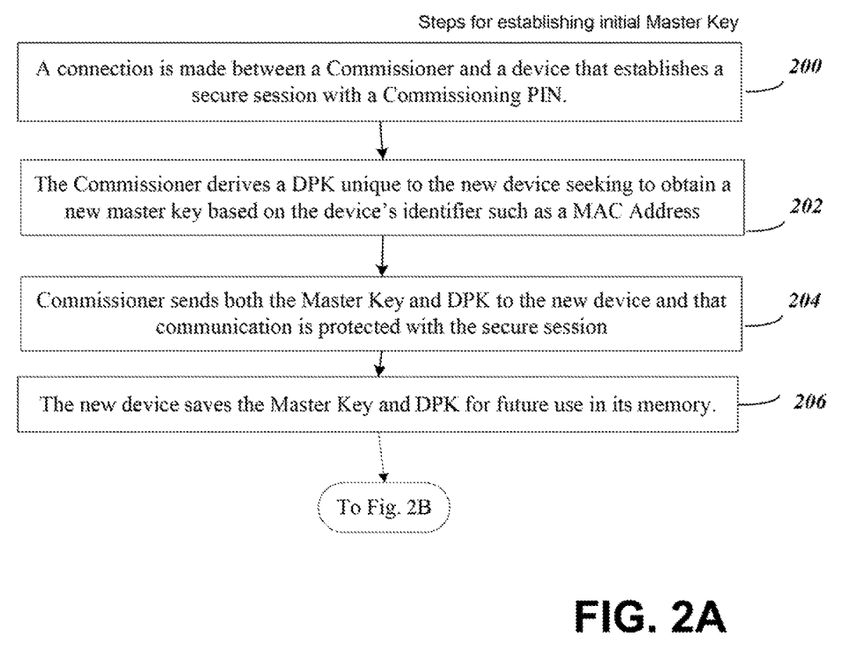
FIGS. 2A-2C provide a flowchart showing steps of a first version of an embodiment of the present invention to update a master key for a network of devices.
Figure 2B:
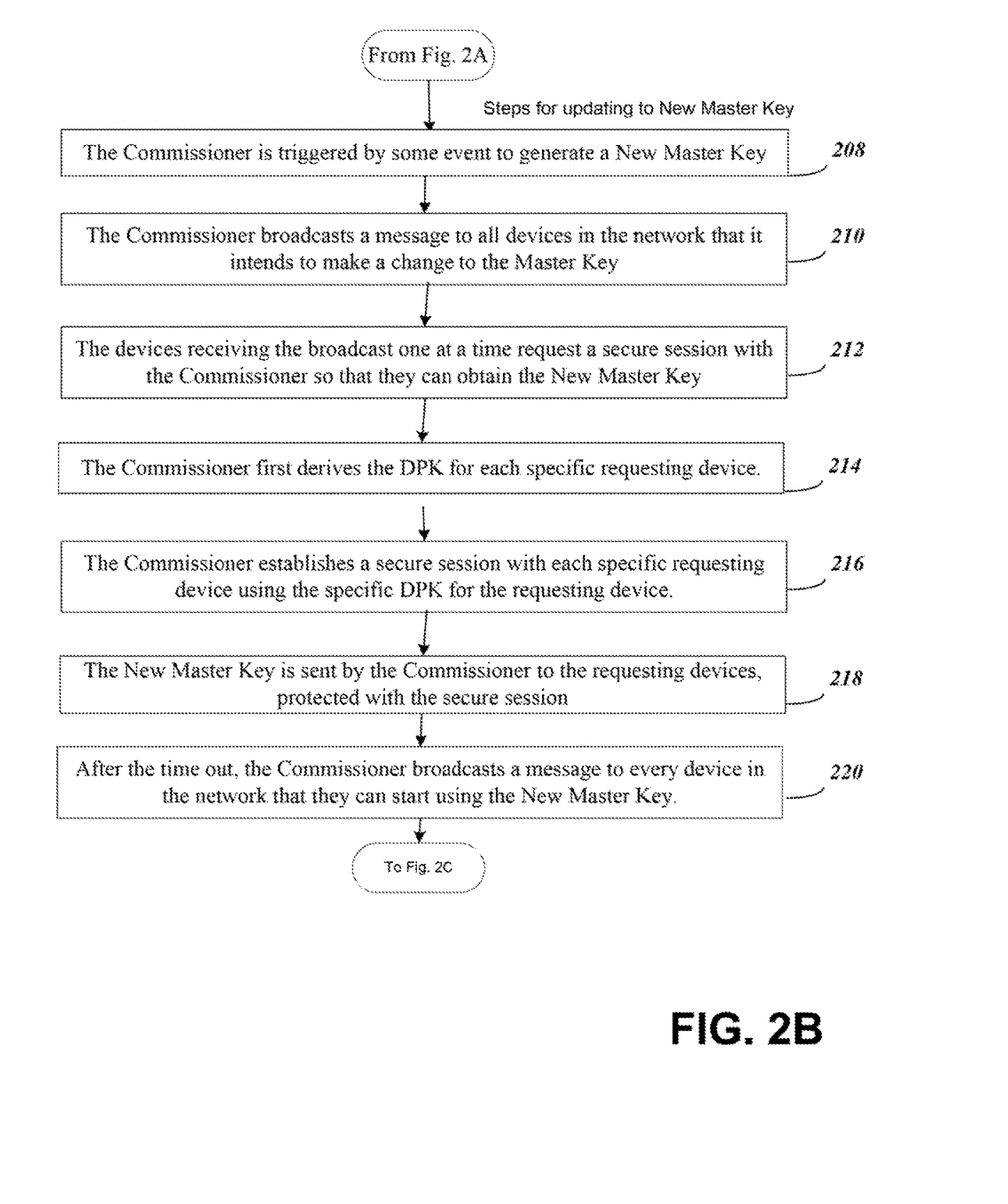
Figure 2C:
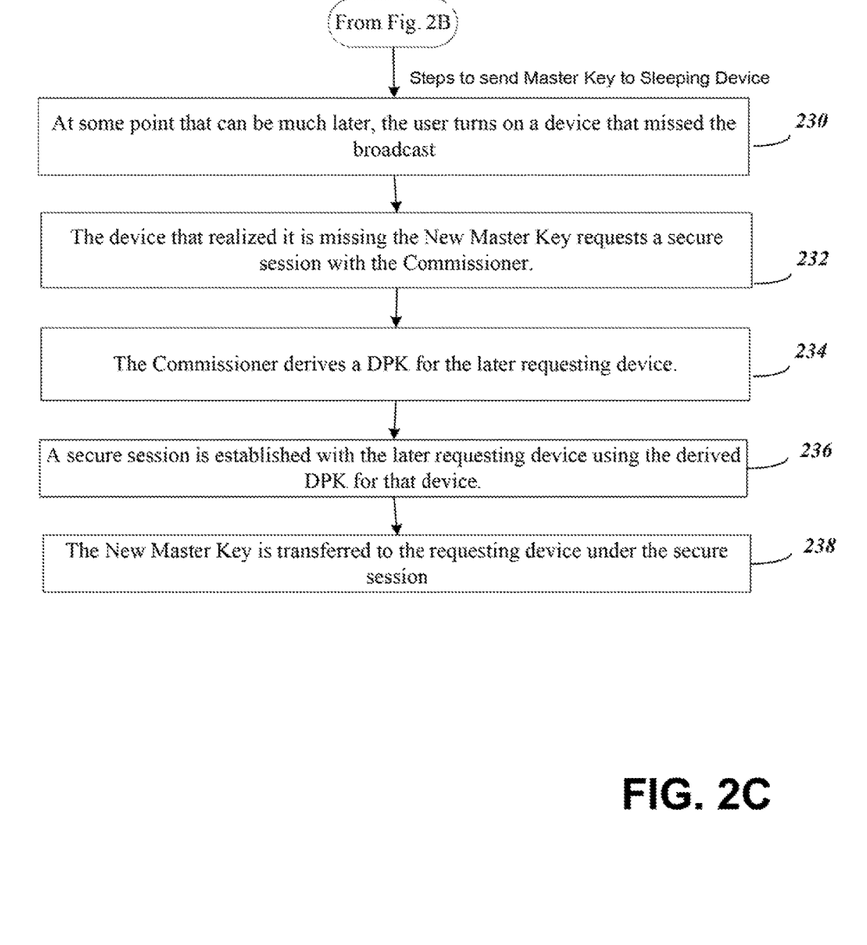

FIGS. 2A-2C provide a flowchart showing steps of a first version of an embodiment of the present invention to update a master key for a network of devices.

In a first step 200, a connection is made between a Commissioner and a device that establishes a secure session with a Commissioning PIN. Each IOT device possesses a pincode that may be used for initial provisioning into an IOT network. In the IOT standards, this process may be called "Commissioning" or "Onboarding". Secure session may be established using the standard secure protocol called DTLS. Other secure protocols such as SSL, TLS or IPsec can be used for the same purpose. Secure session means that both sides have common encryption and integrity keys and can securely exchange messages that are both encrypted and authenticated.

In a further step 202, the commissioner derives a DPK unique to the new device seeking to obtain a new master key based on the device's identifier such as a MAC Address. In step 204, the Commissioner sends both the Master Key and DPK to the new device and that communication is protected with the secure session established in step 200. In step 206, the new device saves the Master Key and DPK for future use in its memory. Master Key is used to encrypt and decrypt all communications on this IOT network. The DPK may be used later for secure Master Key updates. Steps 200-206 complete initially establishing a Master Key for devices in the network. Further steps described to follow illustrate the procedure to update the Master Key.

To begin the process of updating the master key, in step 208, the Commissioner is triggered by some event to generate a New Master Key. In some cases there is a separate device called the Leader that can generate the New Master Key and then securely share a copy with the Commissioner. In step 210, the Commissioner broadcasts a message to all devices in the network that it intends to make a change to the Master Key.

In step 212, the devices receiving the broadcast request a secure session one at a time with the Commissioner so that they can obtain the New Master Key. At this point, the Commissioner may optionally keep a list of device identifiers that are trusted or keep a list of device identifiers that are not trusted. For example, a device that was lost will be considered as not trusted. The Commissioner may reject the request from such a device after receiving the request in step 210. Even with a rejected device, other devices may still be allowed to receive the New Master Key in step 210.

In step 214, the Commissioner first derives the DPK for each specific requesting device. In step 216, a secure session is established between the Commissioner and each separate device using the specific DPK as a common pre-shared key. One method of establishing a secure session with DPK would be to use DTLS or TLS with a pre-shared key. Any pre-shared key based authentication could work, although EC-JPAKE has additional security benefits when a pre-shared key has low entropy. In step 218, the New Master Key is sent by the Commissioner to each requesting device, protected with the secure session.

The above steps 212, 214 and 216 are repeated multiple times for each device that received the broadcast message from step 210. But eventually, in step 220 the Commissioner receives a time out event and assumes that by that time out that all devices in the network have already obtained the New Master Key and no further copies of the New Master Key are distributed. After the time out, in step 222, the Commissioner broadcasts a message to every device in the IOT network that they can start using the New Master Key.

Steps 208-220 complete updating to the New Master Key for devices in the network that are awake. Further steps described to follow illustrate the procedure to added sleeping devices that otherwise should have the updated New Master Key, but otherwise missed the broadcast.

To begin steps for updating to the New Master Key in sleeping devices, in step 230 at some point that can be much later, the user turns on a device that missed the broadcast. That device might have been powered down for some reason or it may be a mobile device that was not in range. Such a device starts exchanging messages with other devices and realizes that it doesn't have the right Master Key. For example, if all TOT messages include an integrity code such as HMAC SHA1, HMAC SHA256 or AES-CMAC which is computed using a key derived from the Master Key. A device will know right away that it is not able to verify this integrity code for any of the messages because of the wrong Master Key. It is also possible to detect the wrong Master Key when the header on each message includes a Master Key ID. The identifier for the New Master Key ID can be different from the previous one.

In step 232, a device that realized it is missing the New Master Key requests a secure session with the Commissioner. The Commissioner may optionally keep a list of device identifiers that are trusted or keep a list of device identifiers that are not trusted. For example, a device that was lost will be considered as not trusted. Commissioner may reject the request from such a device and not proceed with subsequent steps to provide a New Master Key to the requesting device.

Next in step 234, if the process continues, the Commissioner derives the DPK specific to the requesting device. In step 236, a secure session is established. Finally in step 238, the New Master Key is securely transferred to the requesting device.

B. Version 2

Figure 3A:
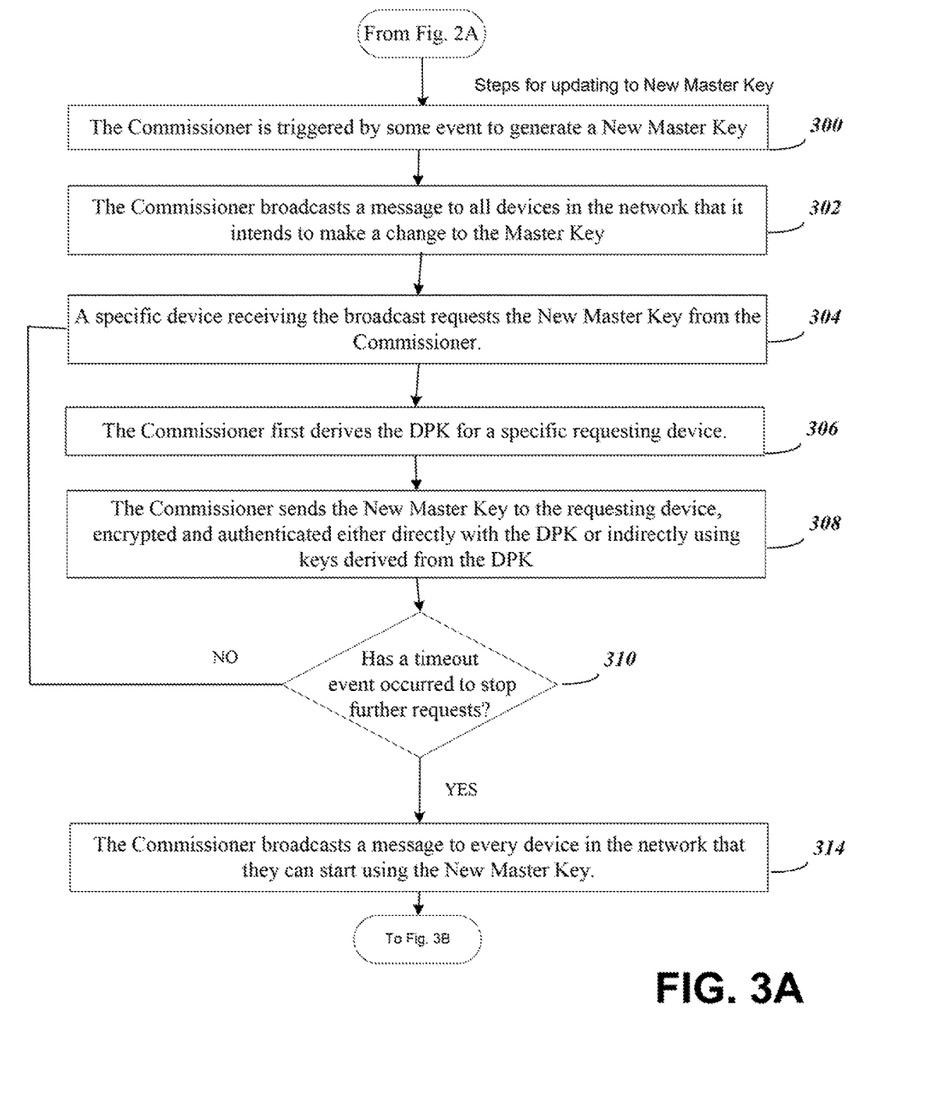
FIGS. 3A-3B provide a flowchart showing steps of a first version of an embodiment of the present invention to update a master key for a network of devices.
Figure 3B:
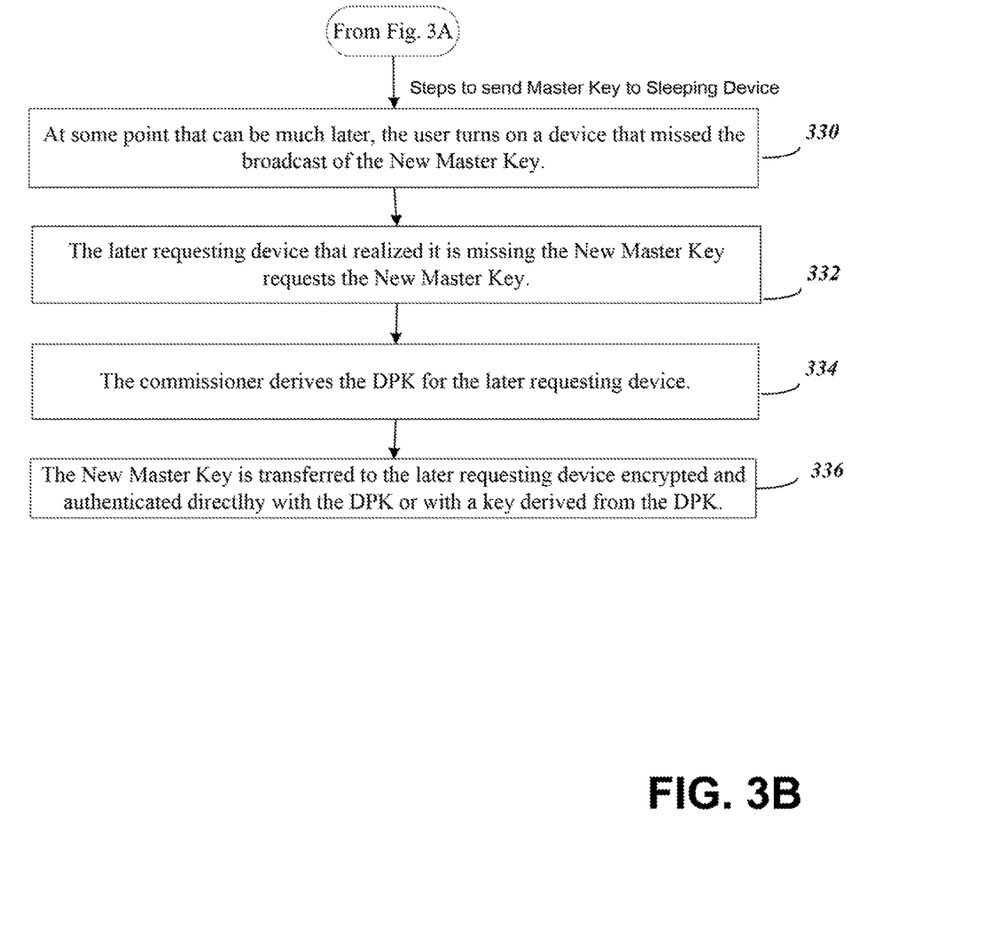

FIGS. 3A-3B provide a flowchart showing steps of a first version of an embodiment of the present invention to update a master key for a network of devices. This alternative Secure Master Key Update is similar to Version 1, except that a secure session is not necessary to deliver the New Master Key to each device. The New Master Key can be encrypted and authenticated directly with the DPK without the need for such a secure session. It may be desirable to use version 2 because it is simplified relative to version 1.

Version 2 uses the same steps shown in FIG. 2A to establish an initial Master Key with devices in the network, so those steps will not be repeated. The description of the method for Version 2 begins with FIG. 3A for updating to a New Master Key.

FIG. 3A begins with step 300, where the Commissioner is triggered by some event to generate a New Master Key. In response in step 302, the Commissioner broadcasts a message to all devices in the network that it intends to make a change to the New Master Key.

In step 304, one specific device receiving the broadcast requests the New Master Key from the Commissioner. The Commissioner may optionally keep a list of device identifiers that are trusted or keep a list of device identifiers that are not trusted. For example, a device that was lost can be considered as not trusted. The commissioner may reject the request from a device that is not trusted, while other devices can still be allowed to receive the New Master Key.

Next in step 306, the Commissioner first derives the DPK for that specific requesting device. In step 308, the New Master Key is sent by the Commissioner to the requesting device, encrypted and authenticated either directly with the DPK or indirectly using keys derived from DPK. Under the inquiry step 310, the above steps 304, 306 and 308 are repeated multiple times for each device that received the broadcast message from step 302. But eventually the Commissioner in step 310 receives a time out event and assumes that by that time out that all devices in the network already obtained the New Master Key, and the process proceeds to step 312. After the time out, in step 312 Commissioner broadcasts a message to every device in the IOT network that they can start using the New Master Key.

Steps 300-312 complete updating to the New Master Key for devices in the network that are awake. Further steps described to follow illustrate the procedure to added sleeping devices that otherwise should have the updated New Master Key, but otherwise missed the broadcast.

To begin steps for updating to the New Master Key in sleeping devices, in FIG. 3B step 330 at some point that can be much later, the user turns on a device that missed the broadcast. In step 332, the device realized it is missing the New Master Key and requests the New Master key. The commissioner in step 334 then derives the DPK specific to the later requesting device. Finally, in step 336, the New Master Key is sent by the Commissioner to the requesting device, encrypted and authenticated either directly with the DPK or indirectly using keys derived from the DPK.

C. Version 3

Figure 4:
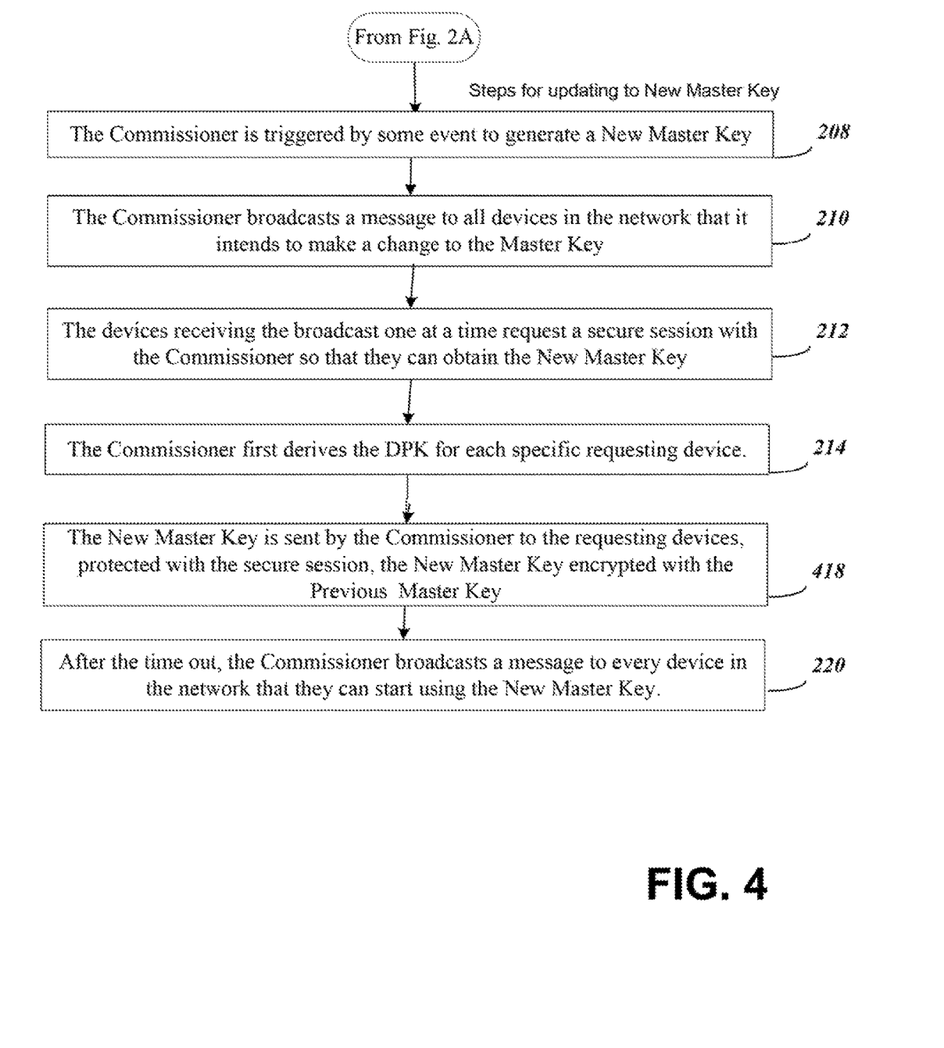
FIG. 4 provides a flowchart showing steps of version 3 of an embodiment of the present invention to update a master key for a network of devices.

FIG. 4 provides a flowchart showing steps of version 3 of an embodiment of the present invention to update a master key for a network of devices. This alternative Secure Master Key Update of Version 3 is similar to Version 1, except that a secure session is not necessary to deliver the New Master Key to each device. Instead, the New Master Key is broadcast encrypted with the current Master Key.

Thus, with version 3, the steps of FIG. 2A are the same as version 1 to initially establish an original Master Key. The steps of FIG. 2B to update to a New Master Key are also the same for steps 208, 210, 212 and 214 in FIG. 4. However, in FIG. 4 the step 216 of FIG. 2B to establish a secure session is removed. Further the step 218 of FIG. 2B is replaced with a step 418 where the New Master Key is encrypted with the Current Master Key instead of using a secure session.

Devices that happened to be off-line during that broadcast will still use their DPK to authenticate to the Commissioner and request the New Master Key, since the Previous Master Key will no longer be available. Thus, for version 3, the steps of version 1 in FIG. 2C are still used for sleeping devices that are off-line during the broadcast of the New Master key.

This version 3 of the Master Key update is not as secure since all devices that still have the current Master Key and are in the wireless network range will be able to obtain the New Master Key. But this version 3 method is simpler than what is in version 1 and 2 and still addresses the usability issues by fully automating the Master Key update, even for devices that were offline during the initial broadcast of the New Master Key.

D. Version 4

Figure 5:
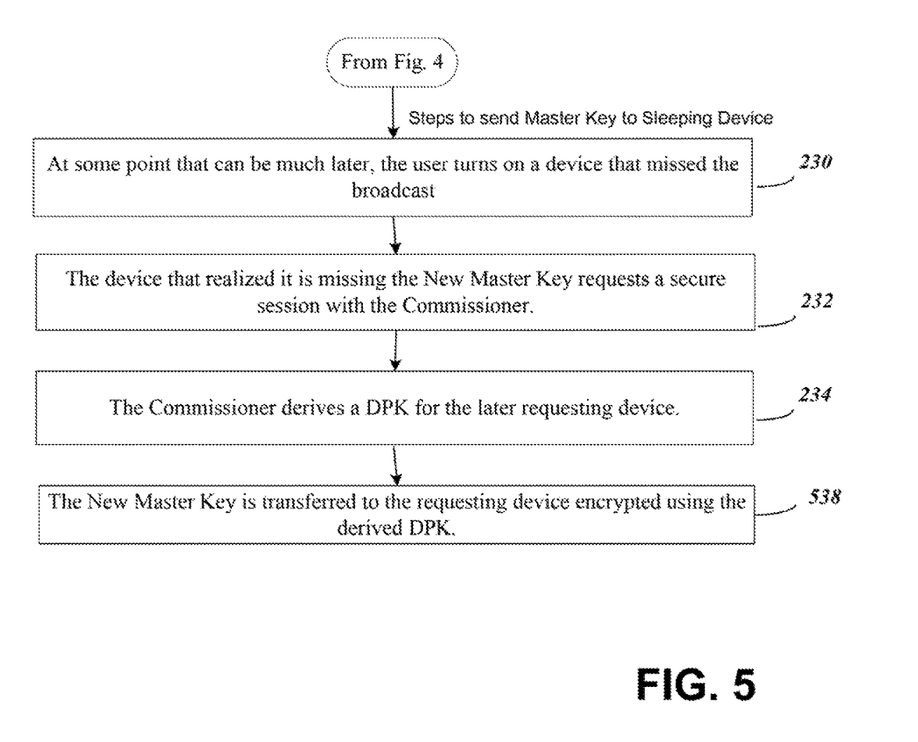
FIG. 5 provide a flowchart showing steps of version 4 of an embodiment of the present invention to update a master key for offline devices that use the online change procedure of version 4.

FIG. 5 provides a flowchart showing steps of version 4. This alternative is similar to Version 3, except that the New Master Key is directly encrypted and authenticated with DPK instead of establishing a secure session when a device that is not online comes back online and realizes it needs the New Master key. The steps of version 4 to establish an initial master key are the same as version 3 through FIG. 4. For version 3, FIG. 5 replaces the steps of FIG. 2C to establish the New Master Key when devices are offline.

FIG. 5 shows the steps of version 4 for providing the New Master Key to sleeping devices. The steps of FIG. 5 for version 4 are the same as the steps of FIG. 2C for version 1 up to step 234. The step 236 that establishes a secure session is eliminated in FIG. 5B. Instead of using a secure session, a step 538 is introduced in FIG. 5B, where the New Master Key is sent to the requesting device encrypted with the DPK.

III. Deriving and Updating the Network Seed Key (NSK)

If the Commissioner device is lost, it may not be safe to continue operation with the existing Network Seed Key (NSK) that is utilized to generate a DPK for each device. Accordingly, embodiments of the present invention provide a mechanism under some circumstances where the NSK needs to be updated. Once the NSK is changed, every device in the network needs to repeat the initial commissioning steps shown in FIG. 2A with a Commissioning PIN in order to receive a new DPK that would be valid in this network.

Loss of a Commissioner device may be rare, but it is still undesirable for a user to repeat the Commissioning of every device in the IOT network. Embodiments of the present invention make updating of the NSK more convenient by using a special One Way Function (OWF) for deriving the DPK. Use of this OWF in deriving the DPK is described in sections that follow.

A. Deriving DPK

To derive the DPK, embodiments of the present invention will use an Elliptic Curve with an odd prime field such as the NIST P-256 curve. Any other Elliptic Curve can also be utilized for this purpose. One source that may be used for details on Elliptic Curves is "SEC 1: Elliptic Curve Cryptography" published by Certicom Research on Sep. 20, 2000.

The Elliptic Curve used with embodiments of the present invention has a base point called G. Instead of directly providing a DPK, the Commissioner provides the following to each device:

$$Q=(NSK*ID)G$$

Here, the multiplication of NSK*ID by the Elliptic Curve base point G is not the normal arithmetic multiplication. This is a special operation that is defined only for Elliptic Curves, as defined in the above SEC 1 reference. The resulting Q that is shared with each device is not a single value but an Elliptic Curve point consisting of the two components $Q_x$ and $Q_y$.

And each device in a network can derive the DPK from Q. Although any derivation function is possible, the simplest one is just DPK=Q. In other words, only the x-component of the Elliptic Curve point Q is used as the DPK. The y-component is not used in the derivation but must still be saved in the IOT device as further explained below.

Note that this Elliptic Curve operation qualifies as a one-way function and there is no feasible technical means to reverse the operation and find NSK*ID from Q. Finding NSK*ID from Q is known as an Elliptic Curve Discrete Log Problem and is not feasible for any standard Elliptic Curves that are of sufficiently large size.

Note that the above formula is mathematically equivalent to the more efficient formula:

$$Q=((NSK*ID) \bmod \text{order}(G))G$$

More specifically the result of the arithmetic multiplication NSK*ID is first reduced modulus order of the base point G. This is equivalent to the above formula which would be clear to an Elliptic Curve cryptography expert. The later version of the formula is more efficient since the number multiplying G is potentially a much smaller number after the modular reduction.

B. Updating the NSK

Let us say that the worst happened and a laptop serving as the network's Commissioner got lost and could have fallen into the wrong hands. In that case, according to embodiments of the present invention a New NSK will be generated called an NNSK. The current value of the NSK, however, is still known to one or more backup Leader or backup Commissioner devices in the network.

To prevent use of the current NSK by undesired entities to create the NNSK, instead of directly generating the NNSK, a random large integer value a will be generated that can be used to determine NNSK as follows:

$$NNSK=\alpha*NSK,$$

where '*' denotes a simple arithmetic multiplication and not the special Elliptic Curve multiplication of a scalar by an Elliptic Curve point.

The above formula to calculate NNSK is equivalent to the following more efficient version of the formula:

$$NNSK=(\alpha*NSK) \bmod \text{Order}(G)$$

The modular reduction by the order of the base point G results in the smaller but still mathematically equivalent NNSK value.

After the determination of the old NSK to the NNSK is made, the old NSK is replaced by NNSK in the Commissioner and also in the Leader device. The lost laptop device is no longer the current Commissioner in the network. It will not know the value of a and therefore will be unable to derive NNSK.

After the change is made from the old NSK, the Commissioner sends out a broadcast message to every device in the network with the value of a. In some embodiments the value of a sent to the devices can be encrypted with the Master Key or some other means. By encrypting a only the devices that are authorized on the network will receive a.

After each device in the network receives a secure broadcast message containing a, the device derives the New Elliptic Curve point Q called NQ as follows:

$$NQ=\alpha Q$$

where the multiplication of a and the Elliptic Curve point Q is a special Elliptic Curve operation provided in accordance with embodiments of the present invention.

After each device in the network has replaced Q with NQ, the value NQ is then used to derive the New DPK value called NDPK.

Although many such derivation functions are possible, it is simplest to just take the x-coordinate of point NQ called $NQ_x$. According to some embodiments of the present invention, the $NQ_x$ value is used. The value for NQ using only $NQ_x$ is as follows:

$$NQ=\alpha Q=(\alpha*NSK*ID)G=(NNSK*ID)G$$

After all devices replace their Q with NQ and the Commissioner replaces NSK with NNSK, the Commissioner will be able to derive each device Q and subsequently the value DPK from the updated NSK. Furthermore, the parameter α can be completely forgotten after this process and so no additional keys need to be saved and kept track of by the Commissioner or by any of the other IOT devices in the network. Once this NNSK update is triggered by the Commissioner, there is no further user action necessary since we do not have to go back to the Commissioning process requiring a PIN. An NSK update is typically triggered by a loss of the Commissioner device which would typically possess both the NSK and the Master Key. Therefore, it would be expected that after an NSK update the Commissioner would proceed further and also update the Master Key.

Figure 6:
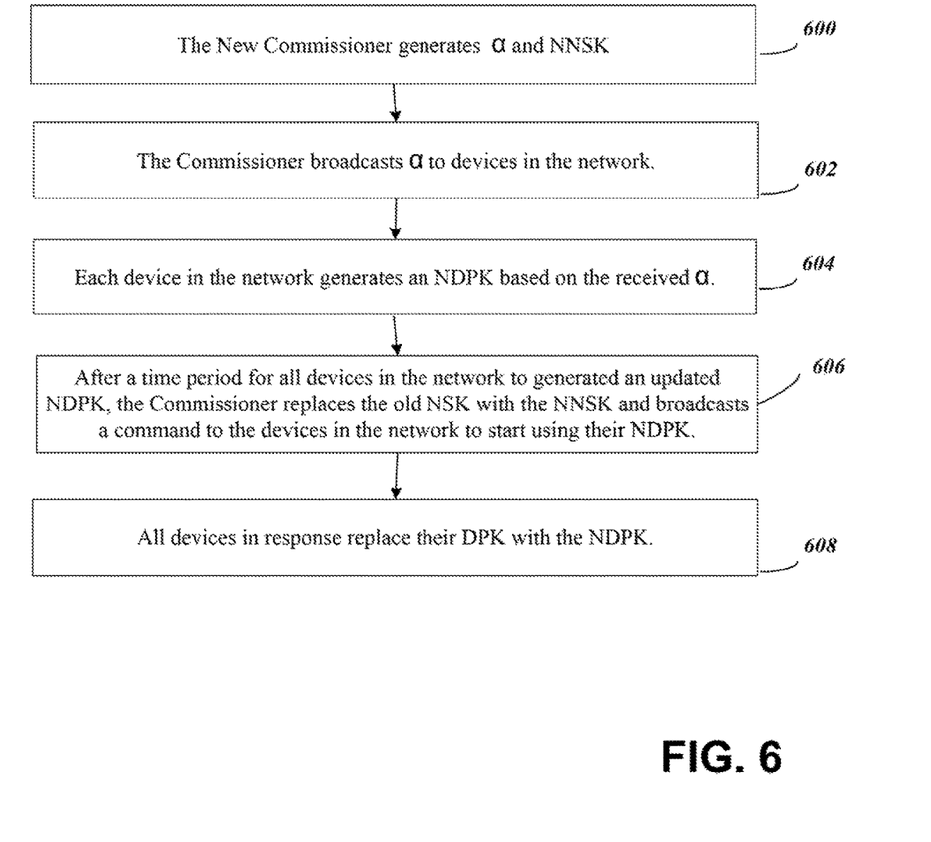
FIG. 6 is a flow chart providing a summary of the steps used to update the NSK to a new NSK.

FIG. 6 is a flow chart providing a summary of the steps used to update the NSK to a new NSK (NNSK). In step 600, a new Commissioner that takes place of an old Commissioner needs to update the NSK and generates parameter α and the NNSK. In step 602, the new Commissioner broadcasts a to all the devices in the network. In step 604, each device in the network generates an NDPK based on the received α. In step 606, after a time period for all devices in the network to generate an updated NDPK, the Commissioner replaces the old NSK with the NNSK and broadcasts a command to the devices in the network to start using their NDPK. Finally, in step 608 all the devices in the network respond by replacing their old DPK with the NDPK.

C. Updating the NSK with Offline Devices

The NSK update as described should successfully update the DPK in all devices that are currently online. However, if for some reason the user still goes ahead with the NSK update while one or more devices are not currently online on the IOT network, those devices would have to be manually provisioned using a pin code based commissioning procedure, the same as for a new device just joining an IOT network.

D. Alternative DPK Derivation

Although IOT devices typically use Elliptic Curve cryptography for efficiency, in another embodiment a method for DPK derivation is provided based on modular exponentiation groups that are commonly used within the Diffie-Hellman key agreement. For this alternative embodiment, the DPK is calculated by the Commissioner as follows:

$$DPK=g^{NSK*ID} \bmod p$$

where p and g are the parameters of a modular exponentiation group that are called prime and generator respectively.

The value g is typically a large prime number that is at least 2048 bits in size. This is also a one-way function and for a sufficiently large p it is not possible to compute a discrete log and derive NSK*ID from DPK. NSK in this case would have to be large. NSK*ID should be equivalent in size to the prime number p and this function will be significantly slower than its Elliptic Curve version.

After the random number a is generated by the Commissioner, a is used to derive NNSK the same way as described previously:

$$NNSK=\alpha*NSK$$

And each device uses a to compute NDPK as follows:

$$NDPK=DPK^{\alpha} \bmod p$$

Substituting, we get:

$$NDPK=g^{\alpha*NSK*ID} \bmod p=g^{NNSK*ID} \bmod p$$

This alternative method for updating the DPK requires more computing resources, so using the previous DPK computation may be more desirable for efficiency.

Although the present invention has been described above with particularity, this was merely to teach one of ordinary skill in the art how to make and use the invention. Many additional modifications will fall within the scope of the invention as that scope is defined by the following claims.

What is claimed:

1. A method for providing a new master key to devices in a network comprising:
   deriving a Device Provisioning Key (DPK) from a Network Seed Key NSK known to a Commissioner and Leader in the local network,
   providing a unique per-device key comprising the DPK from the Commissioner to each device in the network to establish a secure session;
   wherein the DPK is derived from the NSK as follows: DPK=OWF(NSK, ID), and
   wherein OWF is a One Way Function, and ID is a unique device identifier; sending the new master key from the Commissioner to each of the devices, wherein the new master key is protected using the DPK;
   broadcasting by the commissioner a message to every device in the network that they can start using the New Master Key; and
   providing a new commissioner and updating the NSK with a new NSK (NNSK) using the new Commissioner with a method comprising the following steps:
   generating a parameter a using the new commissioner;
   generating the new NSK (NNSK) using the new commissioner, wherein the devices can determine the NNSK from a;
   broadcasting a from the commissioner encrypted using the new master key;
   replacing NSK with NNSK in the new commissioner; and
   broadcasting from the new commissioner a command to start using a new DPK (NDPK) that can be calculated from the NNSK in the devices.

2. The method of claim 1, wherein the unique device identifier is an IEEE 48-bit or 64-bit MAC Address.

3. The method of claim 1, wherein the OWF can be a SHA-1 or a SHA-256 hash or an AES encrypt or decrypt.

4. The method of claim 1, wherein alpha is a random large integer value, and NNSK=$\alpha$*NSK.

5. The method of claim 1, wherein after broadcast of alpha from the commissioner, each device in the network can derive a New Elliptic Curve point Q called NQ as follows: NQ=$\alpha$Q,
   wherein the NQ can then be used to derive the NDPK using the formula for the DPK with the NNSK substituted for NSK.

6. A method for providing a new master key to devices in a network comprising:
   deriving a Device Provisioning Key (DPK) from a Network Seed Key NSK known to a Commissioner and Leader in the local network,
   providing a unique per-device key comprising the DPK from the Commissioner to each device in the network to establish a secure session;
   wherein the DPK is derived from the NSK as follows: DPK=OWF(NSK, ID), and
   wherein OWF is a One Way Function, and ID is a unique device identifier;
   sending the new master key from the Commissioner to each of the devices, wherein the new master key is protected using the DPK-; and
   broadcasting by the commissioner a message to every device in the network that they can start using the New Master Key,
   wherein prior to the step of deriving the DPK from the NSK, the following steps are performed:
   triggering the commissioner by an event to generate the new master key;
   broadcasting from the commissioner a message to all devices in the network that the commissioner intends to change to the new master key;
   receiving requests at the commissioner from the devices in the network to change the master key to the new master key;
   wherein deriving within the commissioner the new Device Provisioning Key (DPK) is then performed for each separate one of the requesting devices, and
   wherein sending the new master key to the requesting devices is performed by establishing a new secure session between the Commissioner and each one of the requesting devices using the specific new DPK for the requesting device as a common pre-shared key, and
   wherein the new master key is sent by the commissioner to the requesting devices, protected with the new secure session.

7. The method of claim 6, further comprising:
   receiving at a later time a request from a device in the network for the new master key that did not provide a request for transmission of the new master key during initial broadcast of the new master key;
   deriving at the commissioner a further DPK specific to the later requesting device;
   establishing a secure session using the further DPK specific to the later requesting device; and transmitting the new master key to the later requesting device during the secure session.

8. The method of claim 6, wherein the network is an IOT network.

9. The method of claim 6, wherein prior to the steps of claim 1, the following steps are performed:
   establishing an initial secure session with a commissioning PIN provided from a commissioner device;
   deriving within the commissioner an initial DPK unique to a new device in a network based on an identifier for the new device; and
   sending both an initial Master Key and the DPK to the new device under the initial secure session,
   wherein the initial Master Key is used to encrypt/decrypt communications in the network.

10. The method of claim 9, wherein the secure session is Datagram Transport Layer Security (DTLS).

11. The method of claim 9, wherein the identifier for the new device is a MAC Address.

12. A method for providing a new master key to devices in a network comprising:
    deriving a Device Provisioning Key (DPK) from a Network Seed Key NSK known to a Commissioner and Leader in the local network,
    providing a unique per-device key comprising the DPK from the Commissioner to each device in the network to establish a secure session;
    wherein the DPK is derived from the NSK as follows: DPK=OWF(NSK, ID), and
    wherein OWF is a One Way Function, and ID is a unique device identifier;

sending the new master key from the Commissioner to each of the devices, wherein the new master key is protected using the DPK–; and broadcasting by the commissioner a message to every device in the network that they can start using the New Master Key, wherein prior to the step of deriving the DPK from the NSK, the following steps are performed:

triggering the commissioner by an event to generate the new master key;

broadcasting from the commissioner a message to all devices in the network that the commissioner intends to change to the new master key;

receiving requests at the commissioner from the devices in the network to change the master key to the new master key, wherein deriving within the commissioner, the new Device Provisioning Key (DPK) is then performed for each separate one of the requesting devices, and wherein sending the new master key to the requesting devices is performed by sending by the commissioner the new master key to the requesting devices, encrypted and authenticated with the new DPK.

13. The method of claim 12, further comprising:
receiving at a later time a request from a device in the network for the new master key that did not provide a request for transmission of the new master key during initial broadcast of the new master key;

deriving at the commissioner a further DPK specific to the later requesting device; and transmitting the new master key to the later requesting device encrypted and authenticated either directly with the further DPK or indirectly using keys derived from the further DPK.

14. The method of claim 12, wherein prior to the steps of claim 1, the following steps are performed:
establishing an initial secure session with a commissioning PIN provided from a commissioner device;

deriving within the commissioner an initial DPK unique to a new device in a network based on an identifier for the new device;

sending both an initial Master Key and the DPK to the new device under the initial secure session; wherein the initial Master Key is used to encrypt/decrypt communications in the network.

* * * * *